United States Patent [19]

Verbeek

[11] 4,316,536
[45] Feb. 23, 1982

[54] CONVEYOR BELT

[75] Inventor: John M. Verbeek, Belwood, Canada

[73] Assignee: Agri-Canvas Inc., Ontario, Canada

[21] Appl. No.: 131,178

[22] Filed: Mar. 17, 1980

[30] Foreign Application Priority Data

Dec. 12, 1979 [CA] Canada ................................. 341744

[51] Int. Cl.³ ............................................. B65G 15/44
[52] U.S. Cl. ................... 198/699; 156/137; 198/847
[58] Field of Search ..................... 198/846–847, 198/698–699, 688; 56/343, 350, 364; 156/137, 297, 308.6, 309.3; 171/125, 130; 474/204, 250–251, 268, 271

[56] References Cited

U.S. PATENT DOCUMENTS

| 934,321 | 9/1909 | Kidwell | 198/699 |
| 1,982,869 | 12/1934 | Heyer | 474/250 |
| 2,108,486 | 2/1938 | Hansson | 198/846 X |
| 2,122,052 | 6/1938 | Bell | 198/846 |
| 3,373,067 | 3/1968 | Hagstrom | 136/297 X |
| 3,415,700 | 12/1968 | Webster | 198/846 X |

FOREIGN PATENT DOCUMENTS

| 105086 | 5/1907 | Canada . |
| 227155 | 7/1920 | Canada . |
| 543935 | 7/1957 | Canada . |
| 579365 | 7/1959 | Canada . |
| 703316 | 2/1965 | Canada . |
| 715761 | 8/1965 | Canada . |
| 722885 | 12/1965 | Canada . |
| 738161 | 7/1966 | Canada . |
| 744239 | 10/1966 | Canada . |
| 810884 | 4/1969 | Canada . |
| 849227 | 8/1970 | Canada . |
| 900186 | 5/1972 | Canada . |

Primary Examiner—Robert B. Reeves
Assistant Examiner—Douglas D. Watts
Attorney, Agent, or Firm—Roylance, Abrams, Berdo & Farley

[57] ABSTRACT

This invention relates to an improved conveyor belt which has application in the area of agricultural machinery and a variety of industrial fields. More particularly, there is described a conveyor belt comprising a web woven from an extruded nylon cord and having a polyvinyl chloride coating with a plurality of transverse, spaced, vinyl slats heat sealed thereto. Preferably, the vinyl slats comprise an inner core or rigid vinyl and an outer main body of less rigid vinyl, and the rigid core has a T-shaped cross-section and the outer main body has an inverted T-shaped cross-section with a slot of corresponding shape to the inner rigid core for receiving same, and the inner core is secured to the outer main body with a polyvinyl chloride solvent.

5 Claims, 8 Drawing Figures

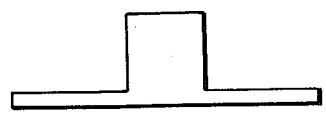
FIG. 4a
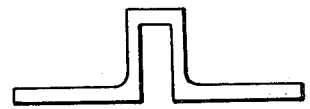
FIG. 4b
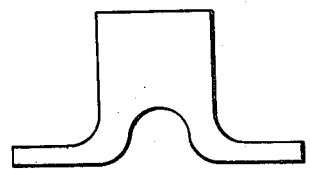
FIG. 4c
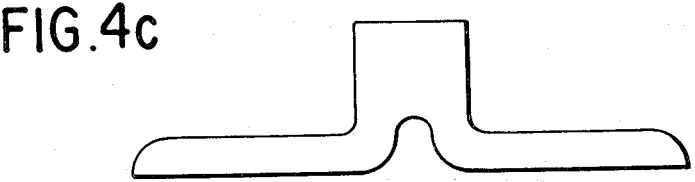
FIG. 4d
FIG. 4e
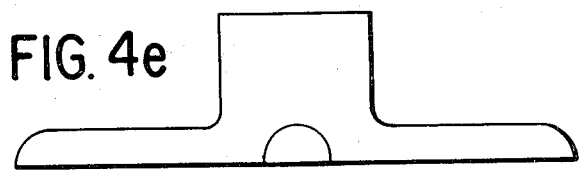

CONVEYOR BELT

FIELD OF INVENTION

This invention relates to an improved conveyor belt which has application in the area of agricultural machinery and a variety of industrial fields.

DESCRIPTION OF PRIOR ART

Various types of conveyor belts are known for a variety of industrial and agricultural uses; examples can be seen in the following patents.

U.S. Pat. No. 2,108,486, issued Feb. 15, 1938, describes an endless conveying strip for a harvester, wherein the joining of the strip is made via one or more resilient members. Wooden slats are located transversely along the strip.

An endless carrier or canvas for a harvesting machine which is made of canvas material and has transverse wooden slats, called cleats, is described in U.S. Pat. No. 2,122,052, issued June 28, 1938. An elastic section is included in the canvas, the section being made either entirely of rubber or of rubber and fabric.

In U.S. Pat. No. 3,302,771, issued Feb. 7, 1967, there is described an endless belt or peaviner apron which is made of nylon fabric having both sides coated with neoprene, or its lower side coated with neoprene and its upper side coated with Hypalon (Trade Mark). The belt ends are skewered together with a slat of wood. Additional wooden slats are used to raise the belt joint as it travels around the pulleys in order to prevent wear of the belt.

Conveyor belting material which is made of heavy woven nylon cloth and rubberized cotton fabric is described in U.S. Pat. No. 3,415,700, issued Dec. 10, 1978. The nylon cloth is subjected to a pre-treatment to reduce its yieldability under longitudinal stress.

A skid-resistant conveyor belt wherein the carcass comprises the lamination of several plies of woven fabric impregnated with rubber and sandwiched between layers of rubber is described in Canadian Pat. No. 543,935, issued July 23, 1957. The canvas may also be formed from strong, longitudinal tensile members according to accepted conveyor belt constructions. The traction side of the carcass is formed with a plurality of transverse, narrow, upstanding ribs which are integrally joined to the carcass. The ribs are molded to the carcass.

A conveyor belt comprising a plurality, usually five or more plies, of fabric such as cotton duck or canvas cemented together in a laminated structure by vulcanization is described in Canadian Pat. No. 579,365, issued July 14, 1959. The belt has spaced upstanding flights, i.e. slats or ribs, constructed of the same vulcanized laminated fabric provided thereon, the flights being secured by vulcanization.

Canadian Pat. No. 744,239, which issued Oct. 11, 1966, describes a conveyor belt wherein the carcass is made of plies of fabric selected from cotton or synthetic material such as rayon, nylon or dacron. The fabric is solid and woven and provided with a special rubber or synthetic rubber cover vulcanized thereto. The carcass could alternatively be made of single-strand cord construction or cord fabric of either natural or synthetic fibre. Any conventional material or construction can be used. Ribs are provided on the carcass which are somewhat harder than the carcass material, but still yieldable. Examples of suitable rib materials are silicone, vinyl, polyethylene, ethylene, propylene, terpolymer, Hypalon (Trade Mark), polyacrylate or other plastics.

Canadian Pat. No. 202,188 describes a binder canvas reinforced with wooden slats which appear to be riveted to the canvas. A conveyor apron having upper and lower layers of fabric with slats interposed between the layers is described in Canadian Pat. No. 105,086.

SUMMARY OF THE INVENTION

The conveyor belt of the present invention has particular application in the field of agricultural, i.e. farm, machinery. It is most useful as a canvas in pull-type swathers or self-propelled swathers. The canvas is used in the apparatus to convey crop material from the cutting table to a center drop to create a windrow. However, the belt can be used on other harvesting equipment such as that used for harvesting grapes, beans, cherries, peaches, apples and plums.

The majority of the belts used in harvesting machines have been made of canvas material with the ribs of transverse slats being constructed of wood riveted thereto. The canvas material does present a number of problems, since moisture and dirt problems are difficult to overcome and the wear and tear of the canvas requires that it be replaced fairly frequently. Further, the manner in which the wooden slats are attached to the canvas material is not satisfactory since the canvas will frequently tear at the points of attachment.

Thus, the present invention provides an improved conveyor belt comprising a belt web woven from an extruded nylon cord and having a polyvinyl chloride coating and a plurality of transverse, spaced vinyl slats heat sealed thereto.

Preferably, each of the vinyl slats comprises an inner core of rigid polyvinyl chloride and an outer body, i.e. main body, of less rigid polyvinyl chloride. More preferably, the inner core is secured to the outer main body with a polyvinyl chloride solvent, such as those conventionally employed.

In its most preferred form, the belt is for a swather conveyor and also includes at one end a pair of steel fastening strips or tie bars which are hollow but contain vinyl inserts, and the strips are provided with transverse through holes for attaching the belt to a swather by means of bolts or the like.

The most acceptable form for the slats is for the rigid core to have a T-shaped cross-section and the outer main body to have an inverted T-shaped cross-section with a slot of corresponding shape in the inner rigid core for receiving same. It is advantageous to secure the inner core to the outer body. Any conventional means may be used for this purpose, although the use of polyvinyl chloride solvent is most successful. Usually, the inner body is extruded and while the main body is extruded, the core is inserted therein. The design of these slats allows the main stress points, which are on the base of the slat in conventional solid body slats, to be spread over the entire outer body of the slat because of the flexibility of the outer body, while the inner core maintains sufficient rigidity to carry the extended load.

The top of the T of the main body is attached to the web by high frequency heat sealing, preferably electronically. The flanges formed by the top of the T are preferably flat with square ends as are the lower corners of the T. This particular design or structure has proved most suitable in practice since it seems to provide for most efficient movement of the crop being harvested.

The web material which has been found to be most useful is that sold under the trade mark "L-50KU". The base fabric is an extruded nylon cord which is woven in plain construction. Both faces of the web are saturated with a polyvinyl chloride coating. The coating prevents saturation of the base fabric, giving it durability.

The canvas of this invention is vastly improved over known canvases. The electronic heat sealing eliminates seam failures. Because of the choice of materials, the canvas is rip-resistant and abrasion-resistant; substantially reduces gumming; the special scrim bunches together to provide high tear strength. The canvas is waterproof and therefore shrink-resistant; it flash dries as it does not absorb water and as a result it is always easy to handle. The canvas is impervious to most oils, greases and chemicals. It scrubs clean with soap and water. The canvas can be stored wet or dry without concern since it is rot- and mildew-resistant. It stays flexible in extreme heat and cold, withstanding outdoor exposure because it is ultra-violet resistant. The vinyl slats do not break or split. The canvas is not only cheaper, but has double the lifespan of conventional cotton canvas.

DESCRIPTION OF THE DRAWINGS

In the accompanying drawings, there is shown a preferred embodiment of the present invention, which is a canvas for a swather which may be of the pull-type or self-propelled type. Referring now to the drawings:

FIGS. 4a to 4e show end views of various rib structures which were tried during development of the present structure.

DETAILED DESCRIPTION

Figure 1:
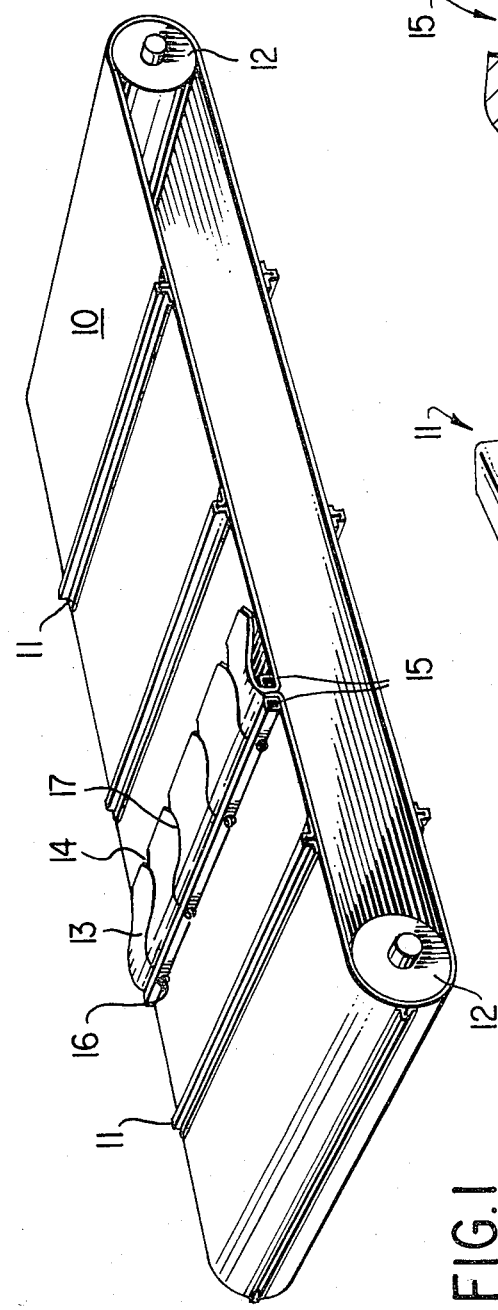
FIG. 1 is a perspective view of a canvas on a pair of rollers on which it would be mounted in a swather.

Turning first to FIG. 1, a conveyor belt or canvas designated generally at 10 can be seen as it would be placed on a pair of rollers 12 in a swather (not shown). The canvas includes a plurality of transverse, spaced, solid vinyl slats 11 which are high frequency electronically heat sealed to the canvas, preferably by conventional electronic means (not shown). One end of the canvas is provided with a pair of strips 15, each of which is provided with corresponding transverse through holes for attaching the belt to a swather by means of bolts 16 or the like. The holes are not visible in the drawings. The other end of the canvas, 13 is provided with a plurality of slits 17, the end openings of which are provided with V-shaped notches 14. For attaching the canvas of a swather, the bolts of the two fastening strips are loosened so that a space is formed between the strips 15, and the end of the canvas including the slits is pulled up between the two fastening strips, with the bolts 16 running through the slits. The V-shaped notches 14 facilitate the pulling of the end through the strips 15 and bolts 16 which extend therebetween. The end of the belt can be pulled snug and the bolts tightened accordingly.

Figure 2:
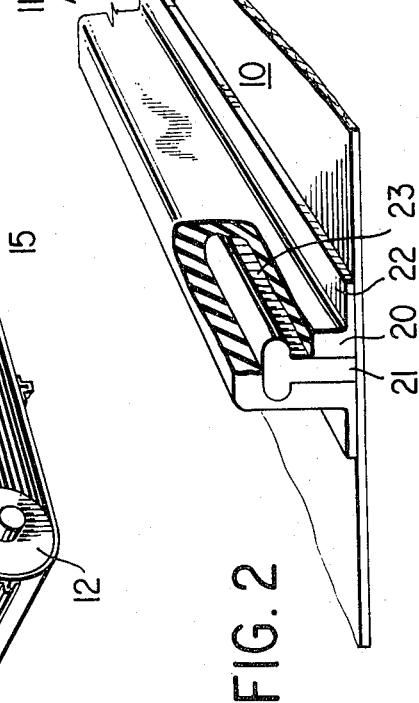
FIG. 2 is an enlarged fragmentary view of a slat or rib of the canvas of FIG. 1.

Referring now to FIG. 2, the construction of the vinyl slats is shown. Each slat comprises an inner rigid core 21, preferably of polyvinyl chloride and an outer main body 20 of less rigid material, preferably polyvinyl chloride. The inner core is preferably formed with a T-shape construction and the outer body includes a slot 23 of corresponding shape and dimension for receiving the inner core 21. The outer main body 20 includes flanged edges 22 which lie on top of the canvas 10 and provide good secure points of attachment thereto. For this purpose, the flanges are of course substantially flat in order to provide a good seal between the rib 11 and the canvas 10.

Figure 3:
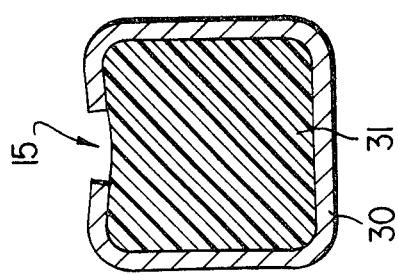
FIG. 3 is a cross-section through a steel fastening strip.

Referring now to FIG. 3, a cross-section through a steel fastening strip is shown designated generally at 15. The steel strip 30 is hollow and open on one side. The interior of the strip has a vinyl insert 31. On tightening of the strips with the bolts 16 the open sides of the strips and the vinyl inserts allow for good secure fastening of the canvas to a swather.

During development of the present conveyor belt, various rib structures were designed and tried before the present structure was chosen. FIGS. 4a to 4e of the drawings illustrate various structures developed during this process. One might readily assume that the replacement of a conventional wooden slat or rib with a vinyl slat or rib of similar design would produce an equivalent rib structure. However, when this type of substitution was carried out (see FIG. 4a), the structure did not provide the desired properties, i.e. the required degree of flexibility and rigidity could not be obtained. When various other structures were provided with more rigid vinyl, these did not prove useful either. An attempt was made to provide a solid vinyl structure having a hollow central core (see FIGS. 4b to 4d inclusive), but again this structure proved undesirable. Finally, a vinyl rib having a solid core of identical material but separate from the remainder of the rib was tried, but again this structure was not effective.

A comparison of conveyor belts having some of the structures illustrated in FIGS. 4a to 4e inclusive was made with the structure of FIG. 2. The belts were used in plant and field trials in a swather/draper. The following Table sets out the results of this comparison.

TABLE

| | RIB STRUCTURE | CONVEYOR BELT RIB MATERIAL | LENGTH OF TEST | COMMENTS |
|---|---|---|---|---|
| 1 | FIG. 4a | 75 Durometer* Flexible Vinyl | 600 acres | Severe cracking at base of slats; not rigid enough across the length; all the stress on the flanges |
| 2 | FIG. 4a | 90 Durometer Flexible Vinyl | — | Difficult to heat seal; too rigid to go around rollers |
| 3 | FIG. 4c | Flexible Vinyl 95A Durometer Y429 | — | Difficult to heat seal; too rigid to go around rollers |
| 4 | FIG. 4c | 75 Durometer | — | Not stiff enough in length |
| 5 | FIG. 4c | 88A Durometer | — | Problems heat sealing |
| 6 | Structure of FIG. 2, but rigid centre core loose | 80 Durometer | 490 hours | Flanges too stiff to go around roller; centre core comes out |

TABLE-continued

| RIB STRUCTURE | CONVEYOR BELT RIB MATERIAL | LENGTH OF TEST | COMMENTS |
| --- | --- | --- | --- |
| 7 Structure of FIG. 2, but centre core burred with heat | 75 Durometer | 630 hours | Centre core breaks loose after 100 hours; runs on roller with no problems; flexing in side wall as designed; stress eliminated from flanges |
| 8 Structure of FIG. 2, but centre core rigid welded on top with P.V.C. solvent | 75 Durometer | 710 hours in plant test 1100 acres in field test | Centre core does not move from flexible outside slat; results excellent |

*Measurement of surface hardness of substance

As can be seen, when a vinyl rib of conventional structure is employed in the conveyor belt, even when a flexible vinyl of great rigidity is employed, that is a vinyl of higher Durometer, the resulting rib structure is not an effective structure. A rib structure identical to that of the present design, except that the centre core was either loose and unattached to the outer body, or burred, was also tested and was found not to perform as well as the rib structure wherein the centre core is welded to the outer body with polyvinyl chloride solvent.

What we claim is:

1. A conveyor belt comprising a web woven from an extruded nylon cord and having a polyvinyl chloride coating with a plurality of transverse, spaced, vinyl slats heat sealed thereto, the vinyl slats comprising an inner core of rigid vinyl and an outer main body of less rigid vinyl, the rigid core having a T-shaped cross-section and the outer main body having an inverted T-shaped cross-section with a slot of corresponding shape to the inner rigid core for receiving same, the inner core being secured to the outer main body with a polyvinyl chloride solvent.

2. A conveyor belt as claimed in claim 1, wherein each vinyl slat comprises an inner core of rigid polyvinyl chloride and an outer main body of less rigid polyvinyl chloride.

3. A conveyor belt as claimed in claim 1, which includes at one end a pair of steel fastening strips for attaching the belt to a swather.

4. A conveyor belt as claimed in claim 1, wherein the vinyl slats are attached to the web by electronic heat sealing.

5. A conveyor belt as claimed in claim 1, wherein the web material comprises an extruded nylon cord which is woven in plain construction, both faces of the web being saturated with a polyvinyl chloride coating.

* * * * *